Figure 1:
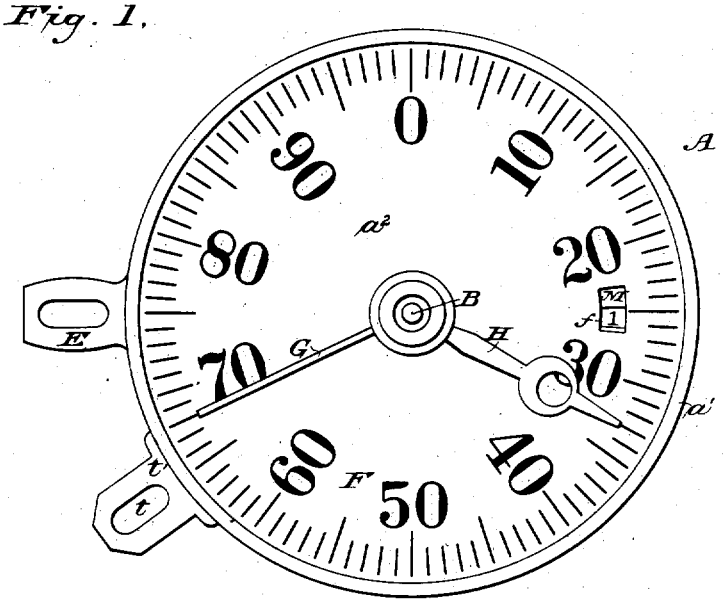

5 Sheets—Sheet 1.

J. B. BENTON,

Assignor, by mesne assignments, to THE RAILWAY REGISTER MANUFACTURING COMPANY.

Passenger Register.

No. 9,312. Reissued July 20, 1880.

WITNESSES

Wm. A. Skinkle

Geo. W. Beck

INVENTOR

John B. Benton,

By his Attorneys

Baldwin, Hopkins & Peyton.

J. B. BENTON,

Assignor, by mesne assignments, to THE RAILWAY REGISTER MANUFACTURING COMPANY.

Passenger Register.

No. 9,312. Reissued July 20, 1880.

*WITNESSES*

Wm. A. Skinkle.

Geo W. Buck.

*INVENTOR*

*John B. Benton,*

*By his Attorneys*

Baldwin, Hopkins & Peyton.

J. B. BENTON,

Assignor, by mesne assignments, to THE RAILWAY REGISTER MANUFACTURING COMPANY.

Passenger Register.

No. 9,312. Reissued July 20, 1880.

WITNESSES

Wm. A. Skinkle

Geo. W. Buck

INVENTOR

John B. Benton,

By his Attorneys

Baldwin, Hopkins & Peyton.

J. B. BENTON,
Assignor, by mesne assignments, to THE RAILWAY REGISTER MANUFACTURING COMPANY.
Passenger Register.
No. 9,312. Reissued July 20, 1880.
Fig. 13,
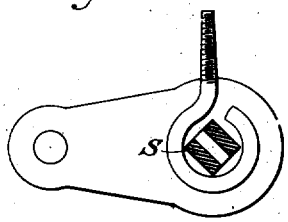
Fig. 14,
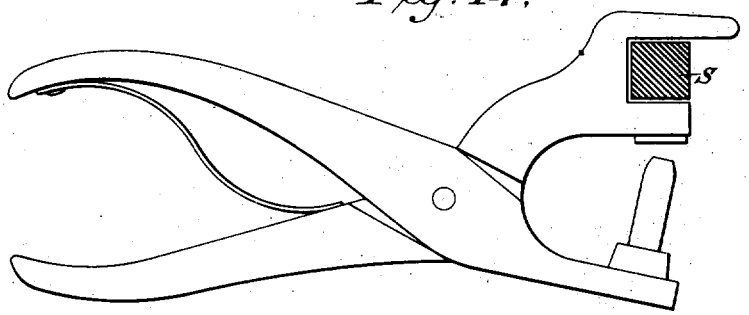
Fig. 16,
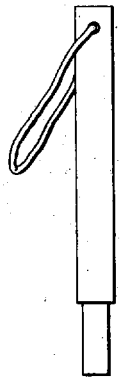
Fig. 15,
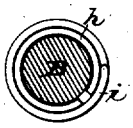
WITNESSES
Wm. A. Skinkle.
Geo. W. Beck.
INVENTOR
John B. Benton,
By his Attorneys
Baldwin, Hopkins & Peyton.

J. B. BENTON,
Assignor, by mesne assignments, to THE RAILWAY REGISTER MANUFACTURING COMPANY.
Passenger Register.
No. 9,312. Reissued July 20, 1880.
Fig. 9,
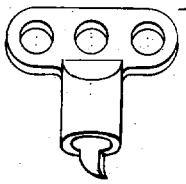
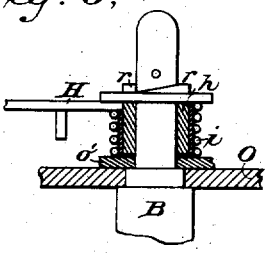
Fig. 10,
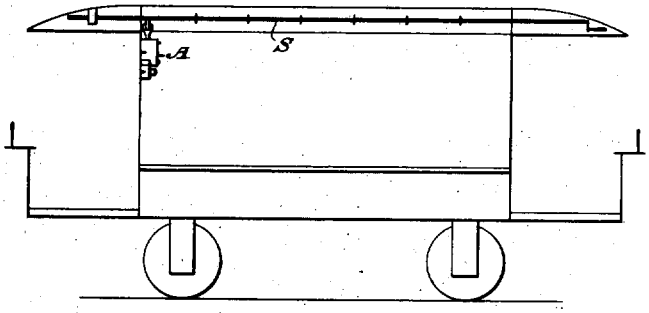
Fig. 12.
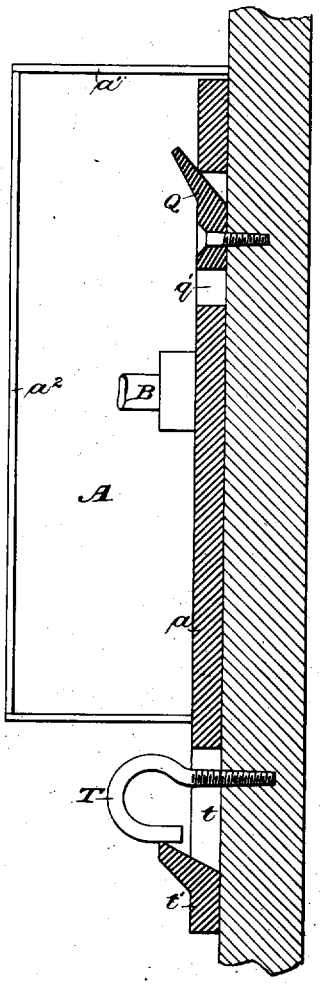
Fig. 11,
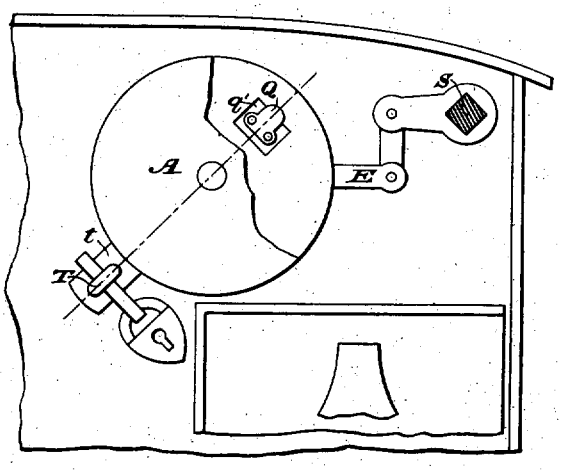
WITNESSES
Wm. A. Skinkle.
Geo W. Buck.
INVENTOR
John B. Benton,
By his Attorneys
Baldwin, Hopkins & Peyton.

UNITED STATES PATENT OFFICE.

JOHN B. BENTON, OF NEW YORK, ASSIGNOR, BY MESNE ASSIGNMENT, TO THE RAILWAY REGISTER MANUFACTURING COMPANY, OF BUFFALO, NEW YORK.

PASSENGER-REGISTER.

SPECIFICATION forming part of Reissued Letters Patent No. 9,312, dated July 20, 1880.

Original No. 167,057, dated August 24, 1875. Application for reissue filed January 22, 1880.

DIVISION A.

*To all whom it may concern:*

Be it known that I, JOHN B. BENTON, civil engineer, of the city, county, and State of New York, have invented certain new and useful Improvements in Machinery for Registering the Number of Passengers Entering Cars, and for various other purposes of a similar nature, now commonly called "passenger" or "fare" registers; and I do hereby declare the following to be a full and exact description thereof, reference being had to the accompanying drawings, making part of this specification.

My invention relates more especially to the class of counting-machines or registers which embody in their organization two sets of registering mechanism operated simultaneously, or nearly so, to record or register the number of fares taken from passengers while riding in or upon street-cars or other public vehicles or conveyances, one of said mechanisms being for the purpose of registering continuously a large number of fares or the fares consecutively received on a large number of trips of the car or vehicle, and incapable of being set to zero or the starting-point at will, now commonly called a "general," "continuous," or "permanent" register, while the other of said registers is for the purpose of registering the number of fares received upon each separate trip, or in some comparatively short interval of time of travel only, of the car or vehicle, and capable of being readily set to zero or the starting-point at the beginning of each trip or stated time, now commonly called a "trip" index or register.

I will here at the outset distinguish or discriminate registers of the class to which my invention belongs from those of a certain other class in which duplex registers simultaneously operated are also employed.

Duplex machines of the class to which my invention belongs have two registering mechanisms simultaneously operated, as before stated, each of said mechanisms being capable of showing at the same time, after undergoing a series of actuations, the total or aggregate of the numbers counted or fares received—that is to say, each register shows as the count proceeds an increase of one for every actuation of a common prime mover or actuator, whereby, during the trip of a car or vehicle or stated interval of time, each register records the same number of fares and acts as and constitutes a check upon the other, and this with the capacity of one of said registers to be returned to zero or the starting-point at pleasure, while the other of said registers is incapable of adjustment and continuously counts the fares received upon a number of consecutive trips.

In the other class of said duplex registers (which differ radically and substantially from the class to which mine belongs in construction, mode of operation, and function or capability) the two registers are simultaneously operated at each actuation of a common prime mover or actuator; but each register is capable of showing at the same time the number or count made for one actuation only, one of said registers only, in other words, being capable of registering consecutively and of maintaining the count made with an increase at every new actuation, while the other of said registers shows but momentarily the count or increase thereof made upon the other register for one actuation, being automatically returned at the finish of each actuation to its zero-point, whereby it will be seen that the register which is incapable of consecutive counting or of maintaining the count made and of increasing it with each successive actuation does not constitute a continuous check upon the other register, nor is, by such a construction and organization, a duplex register obtained in which two registering mechanisms are capable, when actuated, of showing each at the same time the total or aggregate of a series of actuations, the advantages and necessity of which in fare-registering machines are now established.

My improved register embodies in its organization and construction an alarm apparatus, and also a third index or registering mechanism to indicate the number of times the trip-register is turned or brought to the zero or starting point by the resetting device or mechanism for the purpose of detecting and preventing any fraudulent manipulations of the register, and thereby compelling a true and faithful record to be kept of the fares received.

The object of my present invention is to provide a counting or fare register which will be proof against fraudulent manipulations and dishonest practices by the conductor or receiver of the fares, to which manipulations, as far as I am aware, all duplex fare-registers constructed or proposed to be constructed prior to my invention were more or less liable; and to this end my invention consists of certain new combinations and organizations of devices which are pointed out at the close of this specification.

The accompanying drawings represent all my said new combinations of mechanism as embodied in one machine in the best way known to me at the date of filing the application for my original patent.

Figure 2:
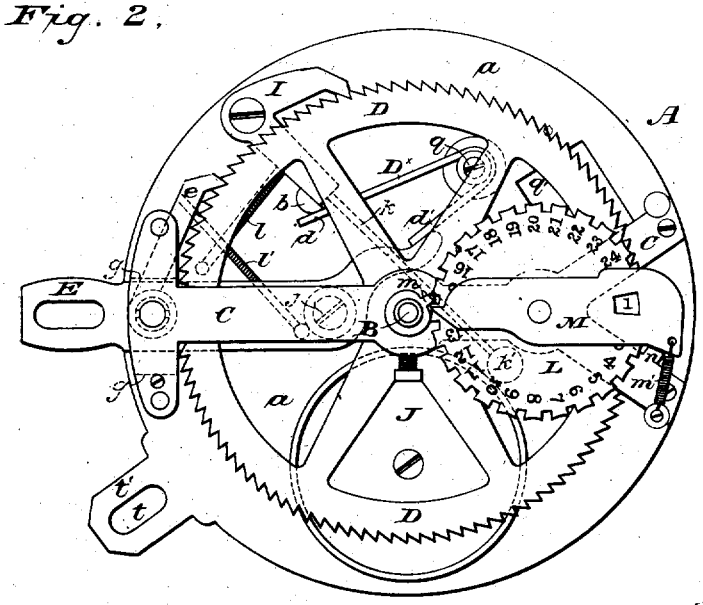
Figure 3:
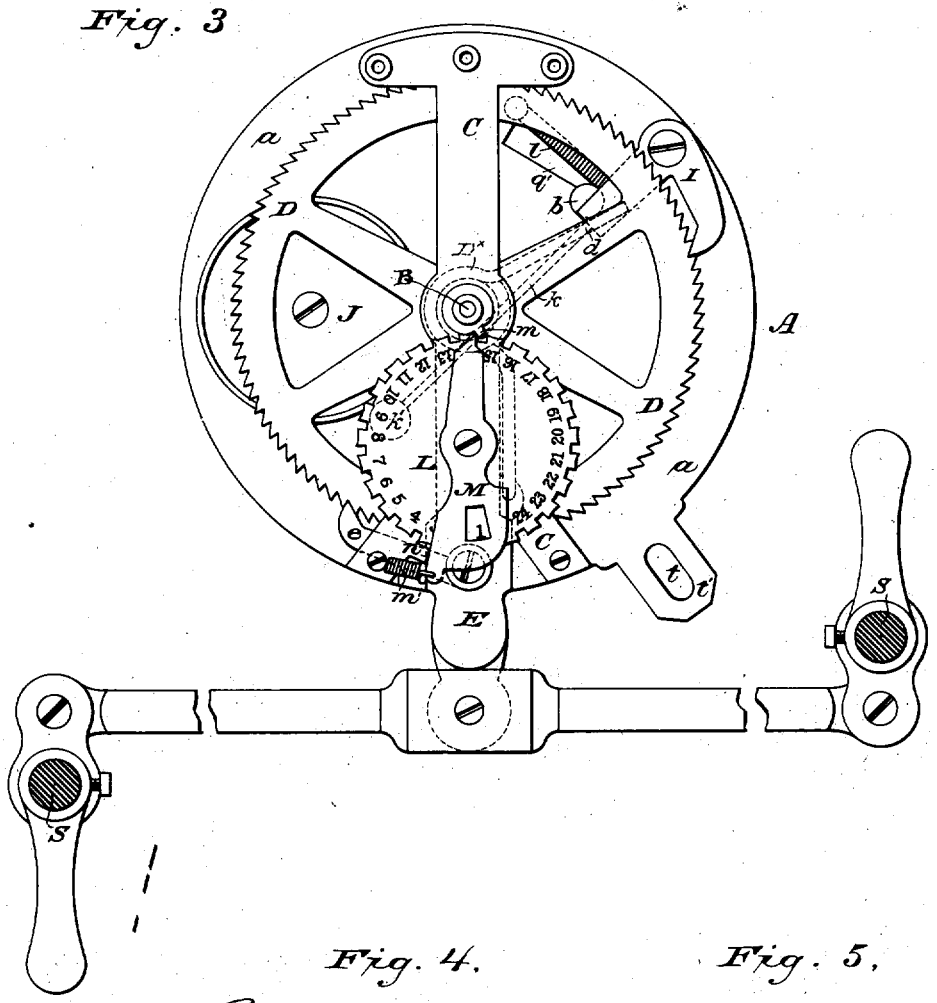
Figure 4:
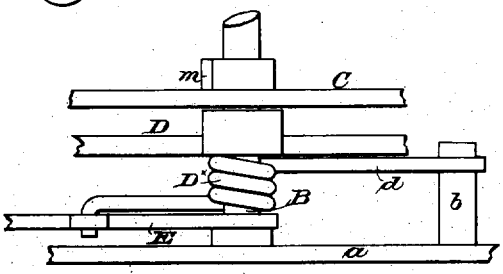
Figure 5:
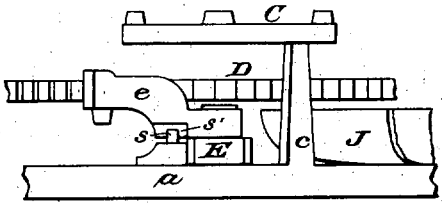
Figure 7:
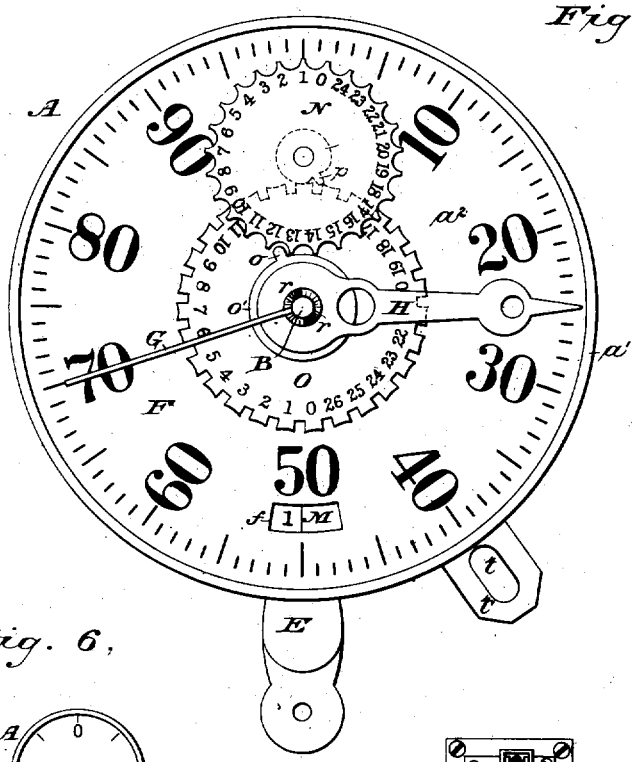
Figure 6:
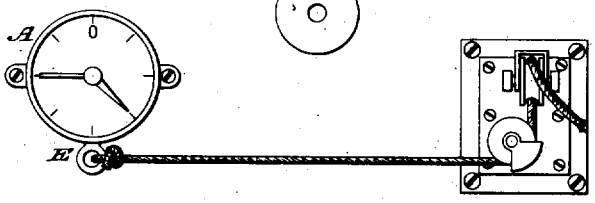
Figure 8:
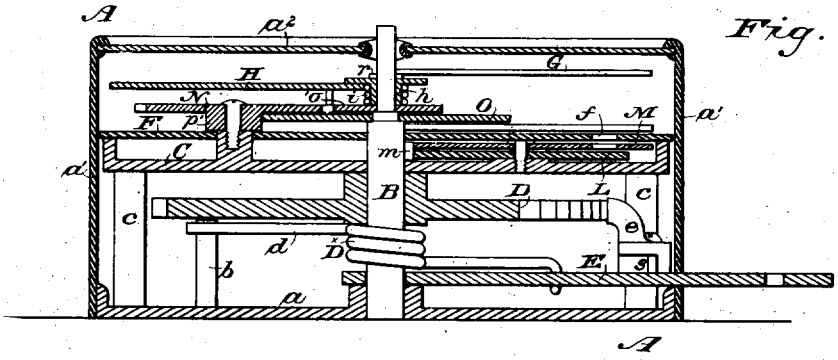

Figure 1 represents a front view of the machine ready for operation. Fig. 2 is a plan of the machine, showing the internal parts thereof. Fig. 3 is a view similar to the one shown in Fig. 2, with an addition of operating connections and handles for operating the machine. Fig. 4 is a broken vertical and sectional view, representing some of the working parts. Fig. 5 is a broken view, showing the position of the actuating-pawl and its connection with the ratchet-wheel. Fig. 6 represents a modification of Fig. 3, showing how the register can be operated by cords and pulleys. Fig. 7 is a front view of the machine, showing two auxiliary dials or detecters. Fig. 8 is a vertical section through Fig. 7. Fig. 9 is a detached sectional view of a portion of the mechanism shown in Fig. 8. Fig. 10 is a longitudinal section through a street-car, showing the position of the register and the rod-connection for operating it; Fig. 11, an inside view of the end of the car with the registering-instrument in position and connected to the operating-rod by means of suitable levers or jointed connections. Fig. 12 is a sectional view through the casing of the register, showing the manner of attaching my improved apparatus in a stationary position in the car. Fig. 13 is a cross-section of the operating-rod and elevation of one of its supports and levers. Fig. 14 shows a wrench for operating the actuating-rod. Fig. 15 is a cross-section through a portion of the trip-register mechanism; and Fig. 16 is an elevation of a pin or lever to actuate the operating-rod by inserting it in a hole or holes arranged at convenient distances along said rod.

My improved register resembles in its general features the one shown in Letters Patent of the United States granted April 27, 1875, to Hamilton E. Towle and myself jointly, as No. 162,717, and constitutes an improvement more especially upon the mechanism and organization of parts shown in that patent, as well as upon that shown in the Deschamps patent of 1854.

The casing A of the registering mechanism is shown as consisting of a base or back plate, *a*, a ring, or band, *a'*, constituting the sides of the casing, and a glass face-plate or covering, $a^2$, through which to read or inspect the registering mechanism inclosed and protected by the casing.

A shaft or axle, B, is mounted centrally in the casing, at rear in the base or back plate, and in front in a suitable cross-bar, C, extending across the diameter of the machine and supported by suitable posts *c*, rising from said base-plate, and is capable of turning freely in its bearings. An actuating ratchet-wheel, D, provided with (in this instance) one hundred teeth in its circumference, is mounted upon the shaft B, and is acted upon by an actuating-pawl, *e*, carried by a pivoted lever, prime mover, or actuator, E, the outer end of which actuator constitutes or is connected with a handle by which to operate the register. The shaft B carries near its outer front end, and between a graduated dial-plate, F, and the glass face-plate or cover of the casing, two index hands or pointers, G H, the one G being firmly and immovably fixed to the shaft, while the one H is connected therewith by a friction-sleeve, *h*, which nearly surrounds the shaft, and is itself surrounded by a clasping-spring, *i*. This spring is smaller than the diameter of the sleeve, and when placed thereon contracts the sleeve, thereby causing it to hold firmly to the shaft, thus securing a constant, even, and any desired amount of tension or friction. (See Figs. 8, 9, and 15.)

The index or pointer G constitutes, in connection with its actuating mechanism and dial, the permanent or general register, while the hand or pointer H constitutes, in connection with the actuating mechanism and dial, the trip index or register, the general register being incapable of resetting, except by working it continuously around, while the trip-register may be turned to zero at will, owing to its frictional connection with the shaft B of the register, by means of a suitable key or implement, independently of the prime mover or actuator of the machine.

The shaft B is made to rotate in its bearings at each actuation of the lever or actuator E, not by direct pulls given the lever, as in the Towle and Benton patent, aforesaid; but upon the back movement or stroke of said actuator by means of a spring, D*, placed under tension by the movement of the lever impelled by the hand in one direction, the register being actuated upon the return movement of the lever in the other direction by the accumulated force of said spring.

In Fig. 2 the actuating-lever is shown as pivoted at *j*, and as provided with a bent or angular end for the actuating-spring to act upon, said spring being coiled around the post *q*, with one of its ends, *d*, resting against the stop *b*, while the other, *d'*, presses against the end of the lever, the range of movement of said lever being limited by two stops or shoulders, *g g*.

In Figs. 3, 4, and 8 the actuating-lever is shown as centered upon the shaft B, with the actuating-spring D* coiled around the shaft, and having one of its ends, *d*, resting against the stop *b* and the other against or fastened to the lever. The spring, in this latter example, also exerts tension or force in a direction to thrust the ratchet-wheel D upward against the cross-bar C, in order, by the friction thus obtained, to prevent the wheel being carried too far forward when impelled by the spring to actuate the register. (See Figs. 4 and 8.)

In order to prevent back movement of the ratchet-wheel D, a locking-pawl, I, is pivoted to the casing and engages with the teeth of the wheel, the pawl permitting forward movement of the wheel, but locking it against back rotation. A spring wire or shank, *k*, is secured to the pawl I, and terminates in a ball or hammer, *k'*, to strike a bell, J, during the actuation of the ratchet-wheel and rise and fall of the pawl, the hammer being caused, for every actuation of the wheel and rise and fall of the pawl, to sound an alarm by means of a spring, *l*, connected with the hammer or pawl in a well-known way.

The spring *l* of course tends to keep the pawl I always in proper contact with the actuating-wheel, while the spring *l'* serves the same purpose for the actuating-pawl *e*.

In order to give the permanent register the capacity of continuously registering a large number of fares, I add, in this instance, a register wheel or disk, L, which indicates the number of times that the index-finger G passes the century-point on the dial-plate F, which dial-plate is provided with one hundred graduations, corresponding to the number of teeth in the wheel D, and is common to the index-hands of the machine—that is to say, the dial F serves for indicating units and tens in both the permanent and trip registers in preference to encumbering the machine with separate dials for the purpose.

The hundreds-wheel L is provided with numerals 0 to 25, inclusive, on its upper face, and with a corresponding number of teeth or notches in its circumference, whereby the continuously-counting register, in this instance, has the capacity of registering two thousand five hundred fares, the wheel L being turned one point at each revolution of the shaft B, and its actuating ratchet-wheel D by a tooth or projection, *m*, on said shaft, which tooth engages the teeth in the wheel, as is well understood.

The wheel L preferably operates on the principle of the well-known "Geneva stop," in order to keep the wheel locked in position when not engaged by the tooth *m*.

To avoid confusion and error in observing the numerals upon the disk L (which are read or inspected through an opening, *f*, in the dial-plate F) during the engagement of the tooth and while the disk L is in motion, a cover-plate or guard, M, is employed and centered with the disk L, and so formed on its end next the tooth *m* that when said tooth actuates the disk it also carries with it the guard-plate M until the tooth escapes and allows the spring *m'* to force the guard-plate suddenly over the last expiring or receding numeral on the disk, and at the same time expose the next higher and advanced numeral, which is read through an opening in the guard-plate. The movement of the guard-plate is determined by the stop *n*.

With the exception of the feature of operating the instrument on the back-stroke, which, however, I do not broadly claim as of my invention, the mechanism so far described is substantially similar to that shown in the Towle and Benton patent aforesaid.

By pulling upon the lever or actuator to rock it on its pivot the actuating-pawl *e* is carried back over one tooth of the wheel, which is held from back action by the retaining-pawl I. On releasing the lever it is immediately thrown forward by the actuating-spring D*, and carries with it the ratchet-wheel D the distance of one tooth, and consequently registers one point on the dial by both permanent and trip hands, the pawl I also being caused to rise on the receding tooth and fall on the next succeeding one with sufficient momentum to ring the bell, through the hammer *k'*, at the same instant that the trip and permanent registers move forward one point, the alarm being sounded, it should be understood, each time a registration is made or effected.

At the end of the trip, if less than one hundred fares have been registered, the trip hand or index is turned forward to zero or the starting-point by hand, independently of the actuator or prime mover, to begin a new trip, while the permanent hand maintains the count already made, being unadjustable.

In order to give the trip-register the capacity of being set to zero, irrespective of the permanent register, in one direction only, instead of in either direction, (which latter method I have found to be a defective one in permitting fraudulent manipulation and tampering with the register,) and thus, in connection with independent mechanism, (shown as consisting of a register, N O, to indicate the number of times the trip-register has been reset to the zero or starting point,) to prevent fraudulent manipulation of the register without detection, I provide the trip hand or index, in the machine organized as shown, with wedge-shaped or inclined projections *r r*, as clearly shown in Figs. 7 and 9.

A key is made to correspond with the projections *r r*, as shown in Fig. 9, whereby the trip-hand can be moved in one direction only independently of the prime mover—that is, when the key is turned in the direction to bring its actuating points or projections against the abrupt shoulders of the projections *r r* the trip-hand can be adjusted around the shaft against the friction of its connection with the said shaft, while it is obvious, if the key were turned in the other direction, it would slip upon the inclines of the projections *r r* and produce no effect upon the trip-hand, owing to the clutch device or connection with the shaft.

The direction in which the trip-hand may be adjusted by its resetting device independently of the permanent register and prime mover is in a forward direction in the example shown.

The detecting dial or wheel N is turned the distance of one notch by the tooth *o*, which projects from a hub, *o'*, carried by the trip-hand, every time said trip-hand is turned to zero by its resetting device, while at every complete revolution of the wheel or dial N the dial O is turned the distance of one notch by the tooth *p* on the hub or shaft *p'* of the dial N.

It will thus be seen that a machine is produced which at all times exhibits three distinct results, namely: first, the number of actuations or operations the machine has received since starting it with the two registers at zero; second, the number of actuations received since the adjustable or trip register was last placed at zero; and, third, the number of times the trip-register has been reset.

Besides the indications above described, the machine is made to strike a blow on a bell for each actuation of the register, thereby giving notice that an indication or registration has been made.

My improved machine not only indicates the number of fares collected on any trip and the totals for several trips independently of each other, but also the number of times the trip or adjustable register has been set to zero, the object of which is to prevent tampering with the trip-register, which might otherwise be set forward to deceive a detective without operating the instrument, and at some other points on the route, after the passengers have left the car, be set back to correspond with the permanent register, whereby the usefulness of the machine would be defeated; but by my invention this difficulty is obviated, the adjustable hand being made to move in one direction only independently of the actuating-lever, and being made also, at every revolution it makes, at the time it reaches zero, to move the detecting-dial N one notch. Consequently the trip-hand must move around as many times as there are notches in the dial to complete the entire revolution of said dial, which dial, in turn, is compelled to move around as many times as there are notches in the wheel O to complete the revolution of said wheel, whereby the trip-hand must move a great many times around the zero-point before the numerals on the dial-plate F and detecter-register can be made to coincide with the point from which they first started. Now the time employed by the conductor in turning the trip-register so that he may defraud the company will be so great that there will be no interval of time between the two ends of his route whereby the numerals can be made to coincide.

The detecter-dials may be increased in number and in diameter. The said dials or register may also be located beneath the dial-plate F, with openings therein of sufficient size to expose each advancing numeral.

To prevent the actuating ratchet-wheel D from being carried forward more than one tooth at one actuation of the actuator or handle, and so as to insure a positive action of the bell-hammer pawl, I have placed a pin, *s*, firmly in the base *a*, between which and the ratchet-wheel D the actuating-pawl *e* works, the said pawl being provided with an inclined recess, *s'*, deepening as it recedes from the pivot of said pawl, (see Fig. 5,) whereby the pawl may be drawn back to be placed in position to operate the ratchet-wheel when impelled forward by the spring D*; but when so impelled, and the pawl has traveled forward just enough to carry the wheel the distance of one tooth, the said pawl will be jammed between the pin *s* and the ratchet-wheel, thereby locking said wheel firmly and preventing its farther forward movement.

The register as organized is intended to be secured firmly in the car, and to accomplish this without delay the back of the casing is provided with an opening, *q'*, for the reception of an inclined hook or horn, Q, whereby the weight of the machine tends to jam and hold the instrument against the side of the car or wall to which said hook or horn is attached.

A staple, T, passing through a slot, *t*, in a projecting ear, *t'*, of the casing, receives a wedge or lock, which must be removed before the machine can be taken from its place.

The staple may be formed to act as a spring to draw the edge of the back firmly against the horn, as shown in Fig. 12. This method of securing registers in place is not of my sole invention, being that of Benton and Towle.

Street-cars are so often crowded that it becomes difficult for a detective to keep a record of the passengers getting in and out, and unless the registering device is so arranged that the conductor can and shall be compelled to register each and every fare directly after the same has been collected and before another has been accepted, the machine loses in a great measure its value. To obviate this difficulty, while securing the register permanently at one end of the car, in full view, I place on both sides of the car a connection, S, (shown in cross-section in Fig. 3,) supported by bearings, and at convenient distances I apply an implement or handles to the said connection, which, on being actuated, communicate motion to the recording mechanism of the machine. Inasmuch, however, as this improved method of operating the register from all parts of the car constitutes the subject-matter of another division (B) of this reissue, it is deemed unnecessary to describe it and the various modifications of my improvement in detail here.

It is believed that my invention will be readily understood from the foregoing description, and that its advantages will be, and have been, appreciated by those familiar with this class of machines.

It is to be understood, of course, that this registering-machine, though explained in particular reference to its application to vehicles or cars, is at the same time equally useful as a counter or registering-machine for printing-machines, engines, stamping-presses, or any other machine having moving parts. It is also equally useful for keeping accounts of persons entering or leaving a theater or hall, passing a turnpike, or entering a ferry, and for other like purposes.

I claim as my invention—

1. The combination, substantially as hereinbefore set forth, of the permanent register, the trip-register, the actuator or lever for simultaneously actuating the two registers by its movement, the alarm for announcing each registration or actuation of the register, and the mechanism which prevents said trip-register being set to zero, but in one direction only, independently of the permanent register or its actuator, while said trip-register is incapable of being actuated during the process of counting without a corresponding actuation of the permanent register.

2. The combination, substantially as hereinbefore set forth, of the permanent register, the trip-register, and the independent register, which registers the number of times the trip-register is turned to zero by its resetting mechanism.

3. The combination, substantially as hereinbefore set forth, of the permanent register, the trip-register, the independent register, which indicates the number of times the trip-register is turned to zero by its resetting mechanism, and the alarm for audibly announcing each registration.

4. The combination, substantially as hereinbefore set forth, of the permanent register, the trip-register, having the capacity of being turned to zero or the starting-point in one direction only irrespective of the operation of the permanent register, and an independent register which indicates the number of times the trip-register has been set to zero by its resetting devices.

5. The combination, substantially as hereinbefore set forth, of the permanent register, the trip-register, the alarm, the actuator or lever for actuating said registers and alarm, the device for setting the trip-register to zero or the starting-point independently of said actuator, and mechanism which registers or records each time the trip-register is brought or turned to zero.

6. The combination, substantially as hereinbefore set forth, of a permanent register, a trip-register, the inclosing-casing of the two registers, an actuator which moves said registers in the process of counting, an alarm apparatus sounded at each actuation of the register, and a device for resetting said trip-register independent of the counting actuator or handle extending outside the casing, to be operated by hand, and possessing the capacity of being moved in one direction only to change the indication of the register or reset it.

7. The combination, substantially as hereinbefore set forth, of the inclosing-casing, the permanent register, the trip-register, the actuator of said registers, the alarm apparatus, the device independent of said actuator to reset the trip-register, which possesses the capacity of being turned in one direction only independently of the permanent register, the independent register, which indicates the number of times the trip-register has been set to zero, and the glass or transparent cover or face-plate of the register, which permits its indications to be inspected or observed.

8. The combination, substantially as hereinbefore set forth, of the actuating-lever and ratchet-wheel with a spring arranged to actuate the wheel by its force in one plane and to furnish force to produce friction in another plane, for the purpose specified.

In testimony whereof I have hereunto set my hand this 19th day of January, A. D. 1880.

JOHN B. BENTON.

Witnesses:
WM. S. BEAMAN,
ANTHONY GREF, Jr.